United States Patent [19]
Shetterly et al.

[11] Patent Number: 5,376,158
[45] Date of Patent: Dec. 27, 1994

[54] METHOD FOR VACUUM IMPULSE FORMING OF HEATED GLASS SHEETS

[75] Inventors: Donivan M. Shetterly, Toledo; Christopher A. Hersch, Perrysburg, both of Ohio

[73] Assignee: Glasstech, Inc., Perrysburg, Ohio

[21] Appl. No.: 952,730

[22] PCT Filed: Mar. 28, 1991

[86] PCT No.: PCT/US91/02142

§ 371 Date: Nov. 19, 1992

§ 102(e) Date: Nov. 19, 1992

Related U.S. Application Data

[63] Continuation of Ser. No. 527,116, May 22, 1990, abandoned.

[51] Int. Cl.$^5$ .............................. C03B 23/035
[52] U.S. Cl. .......................... 65/106; 65/273
[58] Field of Search ............. 65/106, 273, 287; 294/64.1

[56] References Cited

U.S. PATENT DOCUMENTS

| | | | |
|---|---|---|---|
| 3,778,244 | 12/1973 | Nedelec et al. | 65/106 |
| 3,826,381 | 7/1974 | Kulig et al. | 294/64.1 |
| 4,222,763 | 9/1980 | McMaster | 65/287 |
| 4,561,688 | 12/1985 | Tsutsui | 294/64.1 |
| 4,575,390 | 3/1986 | McMaster | 65/273 |
| 4,661,141 | 4/1987 | Nitschke et al. | 65/273 |
| 4,711,653 | 12/1987 | Frank et al. | 65/106 |
| 4,746,348 | 5/1988 | Frank | 65/104 |
| 4,840,657 | 6/1989 | Orain | 65/106 |
| 4,859,225 | 8/1989 | Kuster | 65/104 |

*Primary Examiner*—Joye L. Woodard
*Attorney, Agent, or Firm*—Brooks & Kushman

[57] ABSTRACT

Apparatus (20,120) for forming a heated glass sheet G is disclosed as including a vacuum mold (22,22a,122,122a) having a full surface (24,24a,124,124a) against which a peripheral mold (26,26a,126,126a) presses the glass sheet periphery and with which at least one vacuum reservoir (32,33) is communicated within the interior of the sealed glass sheet periphery to form the glass sheet to the shape of the vacuum mold surface. Valving (38) of a vacuum system (28) is preferably operable to provide the vacuum impulse in two stages with an initial limited extent of vacuum and a subsequent greater extent of vacuum by communication first with one vacuum reservoir (32) and subsequently with another vacuum reservoir (33). Different embodiments of the vacuum mold have the vacuum mold surface facing upwardly and downwardly with convex and concave shapes. Glass sheet shapes including straight line elements such as cylindrical and conical bends as well as shapes including curvatures in transverse directions and inverse curvatures can be effectively provided by this vacuum impulse forming.

7 Claims, 5 Drawing Sheets

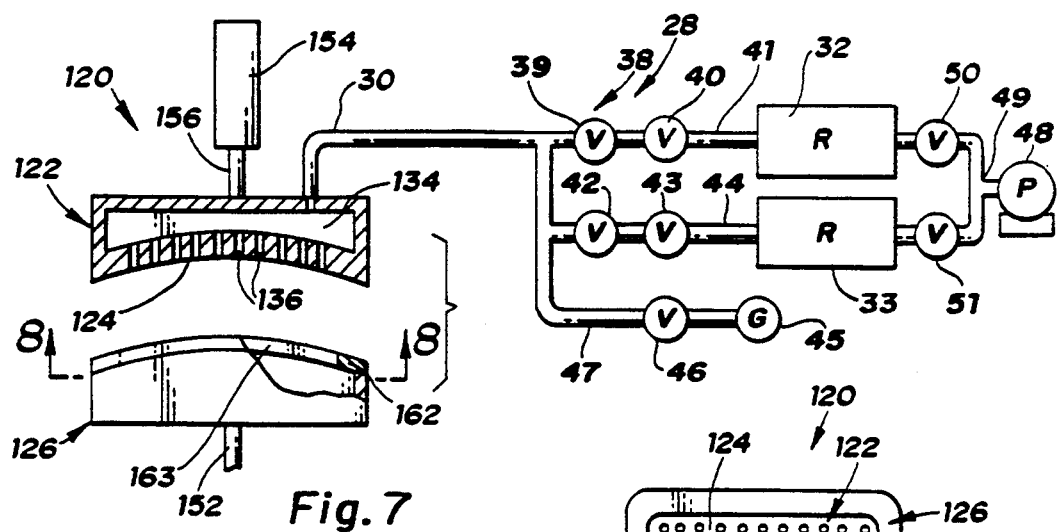
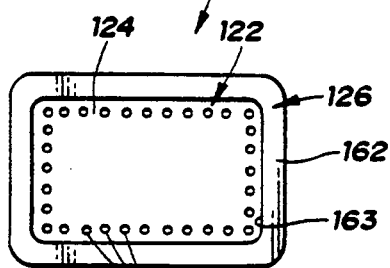
Fig. 8
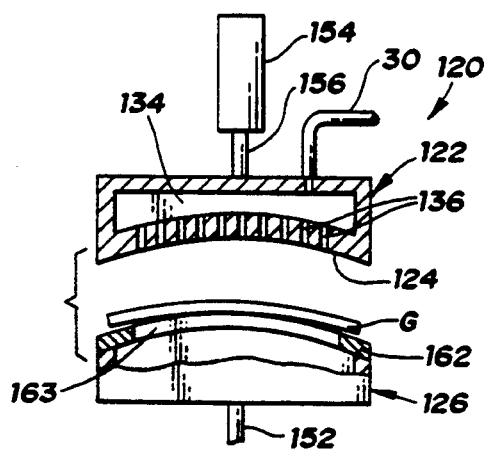
Fig. 9
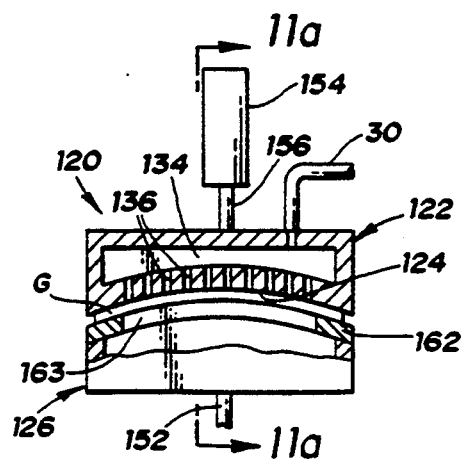
Fig. 10

METHOD FOR VACUUM IMPULSE FORMING OF HEATED GLASS SHEETS

CROSS-REFERENCE TO RELATED APPLICATIONS

This is a 371 of PCT/US91/02142, filed Mar. 28, 1991, which is a continuation of U.S. patent application Ser. No. 07/527,116, filed May 22, 1990, now abandoned.

TECHNICAL FIELD

This invention relates to vacuum forming of heated glass sheets.

BACKGROUND ART

Vacuum forming of heated glass sheets against a curved mold surface has been performed for many years. Such vacuum forming is usually performed by drawing a vacuum within openings in the mold surface. The extent of vacuum utilized is normally on the order of about several to 10 inches (about 10 to 25 cm.) water column. Such a conventional vacuum can be provided by commercially available hot operating fans that are positioned within a heated environment in which the vacuum forming is performed and can also be provided by a gas jet pump such as disclosed by U.S. Pat. No. 4,222,763 McMaster wherein a primary gas flow is introduced into a passageway through jet openings which have axial and circumferential components that are substantially tangent to the inner surface of the passageway such that the primary gas flow induces a secondary gas flow that generates the vacuum through suitable communication passageways.

Prior art glass sheet vacuum forming systems are disclosed by U.S. Pat. No. 3,778,244 Nedelec et al; U.S. Pat. No. 4,661,141 Nitschke et al; U.S. Pat. No. 4,711,653 Frank et al; U.S. Pat. No. 4,746,348 Frank et al; and U.S. Pat. No. 4,859,225 Kuster et al.

DISCLOSURE OF INVENTION

An object of the present invention is to provide a method for providing improved vacuum forming of heated glass sheets by the use of a vacuum impulse which involves a substantially greater vacuum than has been heretofore utilized in vacuum forming of glass sheets.

In carrying out the above object and other objects of the invention, apparatus for forming a heated glass sheet includes a vacuum mold having a full surface that defines a shape to which the glass sheet is to be formed and also includes a peripheral mold for forming and sealing the periphery of the glass sheet against the surface of the vacuum mold. A conduit provides a preferred means for communicating the vacuum mold surface within the sealed periphery of the glass sheet with at least one vacuum reservoir to provide a vacuum impulse that forms the glass sheet to the shape of the vacuum mold surface.

Since the hot glass sheet has viscoelastic characteristics, the greater vacuum for a shorter time, as compared to conventional forming of glass sheets by vacuum, reduces optical distortion resulting from the glass surface engagement with the mold surface. More specifically, the vacuum drawn at the vacuum mold surface within the sealed periphery of the glass sheet is large enough to fully form the glass sheet to the shape of the mold surface but is not applied long enough to overcome the large viscous characteristics of the glass such that reduced optical distortion results at the interface of the glass sheet and the mold.

The conduit that provides the preferred means for communicating between the vacuum mold and each vacuum reservoir preferably includes valving that controls the communication in applying the vacuum impulse. This valving includes at least one valve for: (a) closing the conduit to isolate the vacuum mold from each vacuum reservoir; (b) initially opening the conduit to commence the vacuum impulse at a first level of vacuum; and (c) finally opening the conduit to provide the vacuum impulse to the vacuum mold at a second greater level of vacuum. A pair of vacuum reservoirs of the apparatus provide the initial vacuum impulse at the first level of vacuum and the subsequent vacuum impulse at the second greater level of vacuum. A vacuum pump of the apparatus draws a vacuum within each vacuum reservoir.

Different embodiments of the apparatus are disclosed with the vacuum mold having its full surface facing both upwardly and downwardly and having both convex and concave shapes.

One of the embodiments of the apparatus with the upwardly facing vacuum mold surface has this mold surface provided with a convex shape and has its peripheral mold facing downwardly with a concave shape. Another embodiment of the apparatus with the upwardly facing vacuum mold surface has this mold surface provided with a concave shape and has its peripheral mold facing downwardly with a convex shape. The embodiments of the apparatus with the upwardly facing mold surface each include an actuator that moves the peripheral mold downwardly to press the periphery of the glass sheet against the upwardly facing vacuum mold surface.

One of the embodiments of the apparatus with the downwardly facing vacuum mold surface has this mold surface provided with a concave shape and has its peripheral mold facing upwardly with a convex shape. Another embodiment of the apparatus with the downwardly facing vacuum mold surface has this mold surface provided with a convex shape and has its peripheral mold facing upwardly with a concave shape. The embodiments of the apparatus with the downwardly facing vacuum surface each include an actuator that moves the vacuum mold downwardly such that the upwardly facing peripheral mold presses the periphery of the glass sheet against the downwardly facing vacuum mold surface.

Both the upwardly and downwardly facing embodiments of the vacuum mold surface are disclosed as having versions with straight line elements over the entire extent thereof, curved shapes in directions that are transverse to each other, and inversely curved portions.

The peripheral mold that presses the periphery of the glass sheet against the vacuum mold surface is preferably constructed as a ring mold with an open center.

In carrying out the above mentioned object and other objects of the invention, the method for forming a heated glass sheet in accordance with the invention includes sealing the periphery of the glass sheet against a full surface vacuum mold and communicating the vacuum mold surface within the sealed periphery of the glass sheet with at least one vacuum reservoir to provide a vacuum impulse of at least 0.1 atmospheres of vacuum to elastically form the glass sheet to the shape of the vacuum mold surface, and the vacuum impulse is thereafter terminated at a predetermined time so as to reduce optical distortion of the hot glass sheet as a result of engagement with the mold surface.

In performing the method, the vacuum impulse is preferably provided at the vacuum mold surface initially at a first level of vacuum and thereafter at a second greater level of vacuum. The first and second levels of vacuum are disclosed as being provided by communicating the vacuum mold surface with a pair of vacuum reservoirs. Two different versions are disclosed for performing the method. In one version, the glass sheet periphery is sealed against the vacuum mold surface by a pressing operation of a peripheral mold which maintains the pressing relationship as the vacuum impulse is provided at the vacuum mold surface to form the glass sheet. In another version, the glass sheet periphery is initially sealed against the vacuum mold surface by a pressing operation of a peripheral mold which is thereafter positioned out of engagement with the glass sheet as the vacuum impulse is provided at the vacuum mold surface to form the glass sheet.

The objects, features and advantages of the present invention are readily apparent from the following detailed description of the best modes for carrying out the invention when taken in connection with the accompanied drawings.

BRIEF DESCRIPTION OF DRAWINGS

FIG. 7 is a view of another embodiment of the apparatus for vacuum forming a heated glass sheet wherein an upper vacuum mold has a downwardly facing concave surface against which a lower peripheral mold of an upwardly convex shape presses the glass sheet;

FIG. 8 is a plan view taken along the direction of line 8—8 in FIG. 7 to illustrate both the downwardly facing upper vacuum mold surface and the lower peripheral mold shape that presses the glass sheet against the upper vacuum mold surface;

FIG. 9 is a view of the apparatus of FIGS. 7 and 8 illustrated at the commencement of the vacuum forming cycle with the heated glass sheet supported by the lower peripheral mold;

FIG. 10 is a view of the apparatus of FIGS. 7 and 8 at a further stage of the cycle where the heated glass sheet has its periphery pressed against the vacuum mold surface;

BEST MODES FOR CARRYING OUT THE INVENTION

Figure 1:
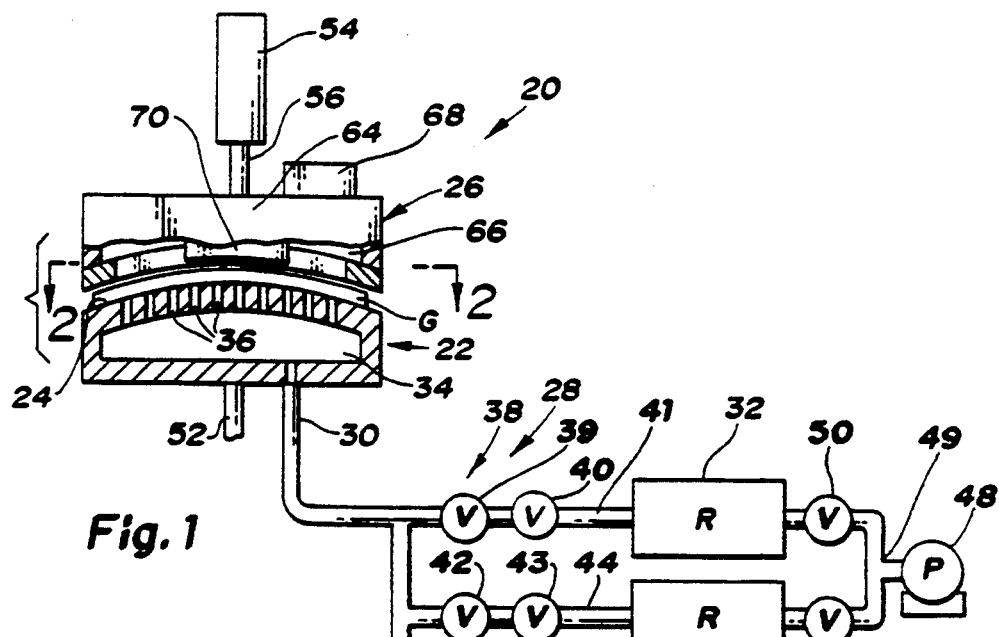
FIG. 1 is a partially sectioned view of one embodiment of apparatus constructed in accordance with the present invention to perform the method thereof for vacuum forming of a heated glass sheet with a lower vacuum mold having an upwardly facing convex shape and with an upper peripheral mold having a downwardly facing concave shape.

With reference to FIG. 1 of the drawings, one embodiment of apparatus 20 for forming a heated glass sheet G in accordance with the present invention includes a vacuum mold 22 having a full surface 24 that defines a shape to which the glass sheet is to be formed. A peripheral mold 26 of the apparatus provides forming and sealing of the periphery of the glass sheet against the surface 24 of the vacuum mold 22 as is hereinafter more fully described. A vacuum system 28 of the apparatus has a conduit 30 that provides a preferred means for communicating the vacuum mold surface 24 within the sealed periphery of the glass sheet with at least one vacuum reservoir 32, and preferably also with a second vacuum reservoir 33, to provide a vacuum impulse of at least 0.1 atmospheres of vacuum to elastically form the glass sheet to the shape of the vacuum mold. This vacuum impulse provides a much greater extent of vacuum than with conventional glass sheet vacuum forming but only for a limited time to reduce optical distortion of the viscoelastic hot glass sheet as a result of its engagement with the vacuum mold surface 24.

Figure 2:
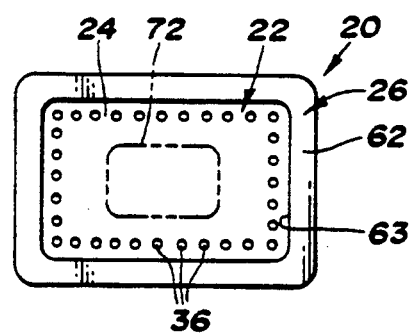
FIG. 2 is a plan view of the apparatus taken along the direction of line 2—2 in FIG. 1 to illustrate both the upwardly facing vacuum mold surface against which the vacuum forming is performed and the downwardly facing peripheral mold shape that initially seals the glass sheet periphery with the vacuum mold surface.

With combined reference to FIGS. 1 and 2, the vacuum mold 22 has a vacuum chamber 34 to which the conduit 30 is communicated, and the vacuum surface 24 has a set of openings 36 that extend to the vacuum chamber such that the vacuum impulse from the vacuum reservoir 32 is applied through these openings to the glass sheet to provide the forming to the shape of the vacuum mold surface. These openings 36 in the vacuum mold surface 24 are preferably arranged as shown in FIG. 2 just inside, i.e. about 2–4 inches (about 5 to 10 cm.), the location at which the peripheral mold 26 provides the sealing of the glass sheet periphery against the vacuum mold surface.

The vacuum system 28 of the apparatus as illustrated in FIG. 1, in addition to including the conduit 30 that extends between the vacuum mold 22 and each vacuum reservoir 32 and 33, also includes valving 38 that controls communication of the vacuum mold and the vacuum reservoir through the conduit. This valving 38 is disclosed as including a flow control valve 39 and an on-off valve 40 along a conduit branch 41 that communicates the conduit 30 with the one vacuum reservoir 32. Valving 38 also includes a flow control valve 42 and an on-off valve 43 along a conduit branch 44 that communicates the conduit 30 with the second vacuum reservoir 33. Another on-off valve 46 along a conduit branch 47 controls the supply of pressurized gas from a source 45 to the conduit 30 for delivery to the vacuum mold 22. As is hereinafter more fully described, the valving 38 initially closes the conduit 30 so as to be isolated from each of the vacuum reservoirs 32 and 33 as well as from the pressurized gas source 45. As is hereinafter more fully described, the valving 38 through the flow control valve 39 and the on-off valve 40 initially opens the conduit branch 41 to communicate the one vacuum reservoir 32 with the vacuum mold 34 to initially provide the vacuum impulse at a first level of vacuum. Thereafter upon closing of the valve 40 to isolate the one vacuum reservoir 32 from the vacuum mold 22, the valves 42 and 43 communicate the branch conduit 44 with the second vacuum reservoir 33 to provide a vacuum impulse to the vacuum mold 22 at a second greater level of vacuum. The vacuum within the pair of vacuum reservoirs 32 and 33 is provided by a vacuum pump 48 through a branched conduit 49 whose branches have associated regulator valves 50 and 51.

The extent of the vacuum impulse provided at the vacuum mold 22 must be great enough to elastically deform the glass sheet as it initially is formed to the shape of the mold surface. Thereafter, viscous flow of the glass maintains the glass sheet in its formed shape. The extent of vacuum necessary to do this elastic forming is controlled by variables which include: the size of the vacuum mold chamber 34, the extent of any leakage which occurs around the periphery of the sealed glass sheet, the size of each vacuum reservoir 32 and 33, and the extent of the vacuum drawn within each vacuum reservoir 32 and 33 by the vacuum pump 48. Satisfactory results have been achieved by applying an initial vacuum of about 0.1 to 0.3 atmospheres of vacuum for about 0.5 to 2 seconds and by thereafter applying a second greater vacuum of about 0.25 to 0.7 atmospheres of vacuum for about 0.5 to 6 seconds. The regulator valves 50 and 51 function to communicate the continuously running vacuum pump 48 with the associated vacuum reservoirs 32 and 33 so as to maintain a vacuum within these reservoirs on the order of about 1/6 to ⅔ of an atmosphere of vacuum. Along each conduit branch 41 and 44, the associated flow control valves 39 and 42 control the flow area which controls the rate at which the vacuum impulse is applied and thereby prevents excessively fast forming that can cause breakage when the glass sheet hits the mold surface.

Figure 3:
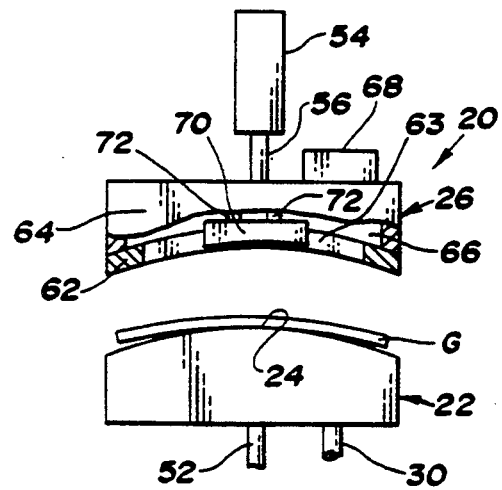
FIG. 3 is a view that illustrates the apparatus of FIGS. 1 and 2 at the commencement of the vacuum forming cycle.

As illustrated in FIG. 3, the cycle of glass sheet forming begins with the glass sheet G deposited on the upwardly facing mold surface 24 of the lower vacuum mold 22. It is possible to initially deposit the glass sheet G onto the lower vacuum mold 22 in different ways. For example, the vacuum mold 22 may have a connection 52 to a suitable actuator that moves the vacuum mold horizontally to below a suitable topside transfer device that supports and subsequently releases the glass sheet onto the vacuum mold prior to subsequent movement of the vacuum mold back below the peripheral mold 26 as illustrated in FIG. 3. The vacuum conduit 30 has a suitable separable coupling or is flexible to permit such movement. It is also possible for the topside transfer device to be moved horizontally to a position above the vacuum mold 22 and to then release the glass sheet onto the vacuum mold with the upper peripheral mold 26 raised as illustrated in FIG. 3.

Figure 13:
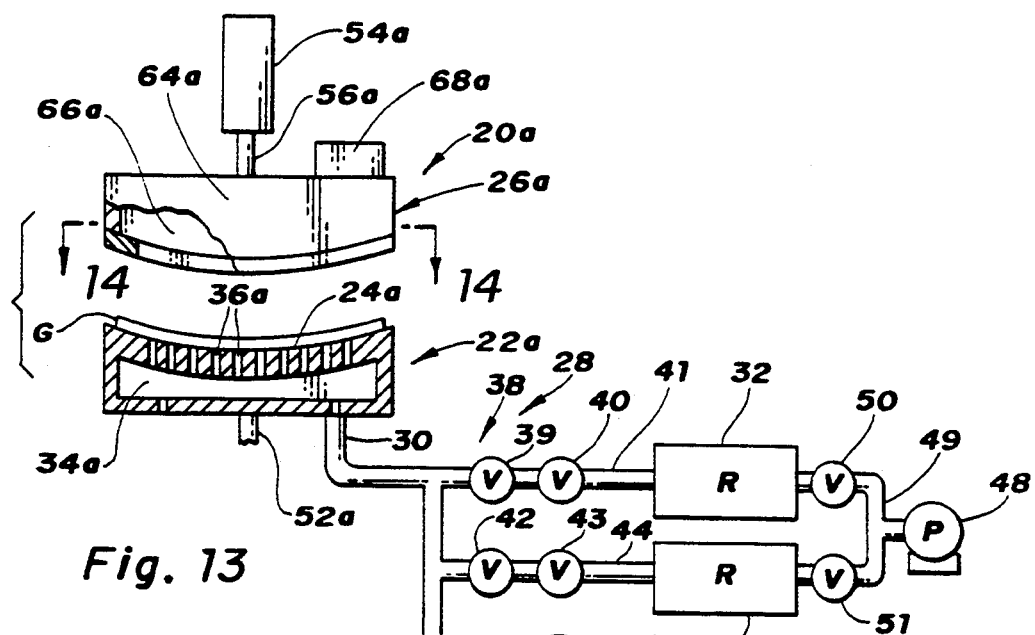
FIG. 13 is a view of another embodiment of the apparatus for vacuum forming a heated glass sheet wherein a lower vacuum mold has an upwardly facing concave surface against which an upper peripheral mold of a downwardly convex shape presses the glass sheet.
Figure 14:
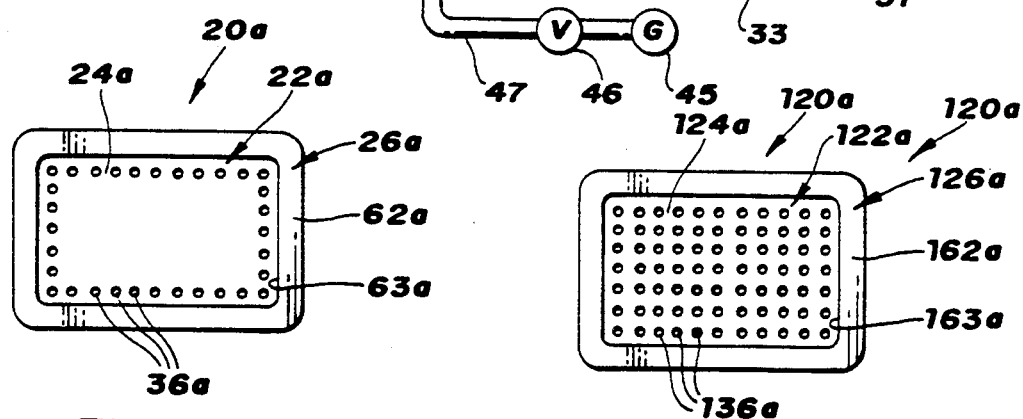
FIG. 14 is a plan view of the apparatus taken along the direction of line 14—14 in FIG. 13 to illustrate both the upwardly facing vacuum mold surface against which the vacuum forming is performed and the downwardly facing peripheral mold shape that initially seals the glass sheet periphery with the vacuum mold surface.

The apparatus 20 illustrated in FIG. 1 has the surface 24 of its vacuum mold 22 facing upwardly with a concave shape and the vacuum mold thus occupies a lower position with respect to the peripheral mold 26 which occupies an upper position. This upper peripheral mold 26 faces downwardly with a concave shape complementary to the convex shape of the vacuum mold surface 24. Another embodiment of the glass sheet forming apparatus illustrated in FIGS. 13 and 14 is similar to the embodiment of FIGS. 1 and 2 and thus has like reference numerals with the subscript "a" applied to like components thereof and most of the prior description is applicable except as will be noted. However, the lower vacuum mold surface mold 24a of the apparatus 22a has an upwardly facing concave shape and the downwardly facing peripheral mold 26a has a convex shape complementary to the upwardly facing concave vacuum mold surface 24a. This upwardly facing concave vacuum mold surface 24a as shown in FIG. 14 has its openings 36a located adjacent the peripheral mold as with the embodiment shown in FIG. 2. The vacuum system 28 shown in FIG. 13 utilized with the forming apparatus 20a is the same as the vacuum system utilized with the embodiment shown in FIG. 1.

Figure 4:
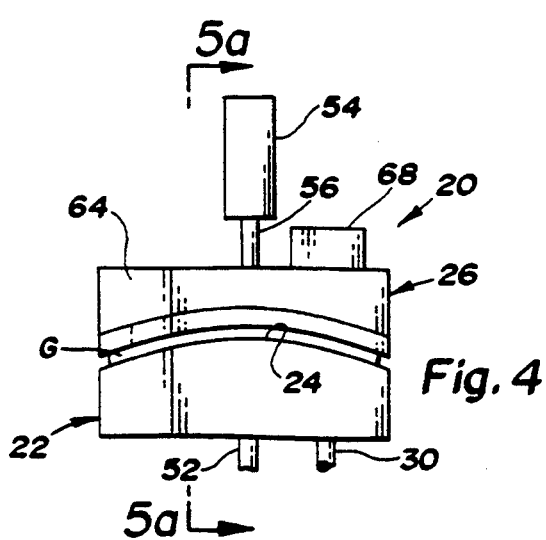
FIG. 4 illustrates the apparatus of FIGS. 1 and 2 at a further stage of the vacuum forming cycle where the peripheral mold has been moved downwardly to seal the glass sheet periphery against the vacuum mold surface.

An actuator 54 of the apparatus 22 shown in FIG. 1 has a connection 56 to the upper peripheral mold 26 and is operable to move the peripheral mold vertically with respect to the lower vacuum mold 22 in order to provide relative movement between the two molds. More specifically, the actuator 54 through its connection 56 moves the upper peripheral mold 26 downwardly from the position of FIG. 3 to the position of FIG. 4 such that its concave shape presses the periphery of the glass sheet G against the upwardly facing convex surface 24 of the lower vacuum mold 22 in preparation for the vacuum impulse forming as previously described in connection with the vacuum system 28. Likewise with the embodiment of FIG. 13, the actuator 54a through its connection 56a moves the upper peripheral mold 26a downwardly such that its convex shape presses the periphery of the glass sheet G against the upwardly facing concave surface 24a of the lower vacuum mold 22a in preparation for the vacuum impulse forming as previously described in connection with the vacuum system 28.

Figure 5A:
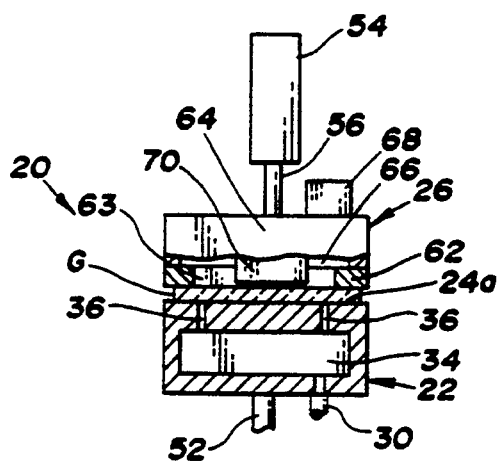
FIG. 5a is a sectional view taken along the direction of 5a—5a of FIG. 4 to illustrate the manner in which more simple shapes can be vacuum formed with the peripheral mold maintaining a pressing relationship with the glass sheet periphery as a vacuum impulse is provided to form the glass sheet.
Figure 5B:
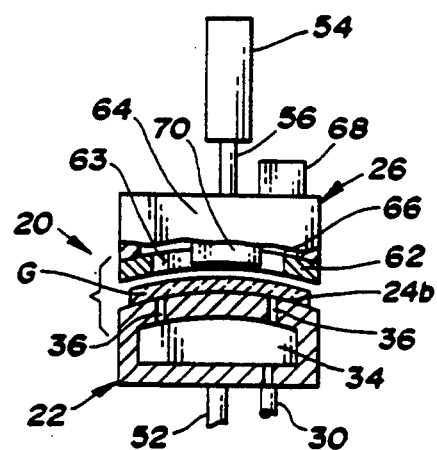
FIG. 5b is a view taken in the same direction as FIG. 5a and illustrates the vacuum mold with its surface shaped so as to provide cross-curvature transverse to the curvature illustrated in FIG. 4 as well as illustrating a spaced relationship of the peripheral mold to the glass sheet when formed by the vacuum impulse against the vacuum mold surface with this more complex shape.
Figure 5C:
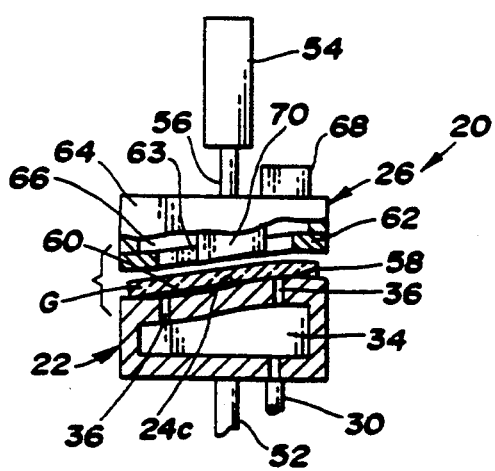
FIG. 5c is a view of the apparatus also taken in the same direction as FIG. 5a and having its vacuum mold surface constructed so as to provide inverse curves as well as illustrating the peripheral mold spaced from the glass sheet as in FIG. 5b when the vacuum forming is performed against the vacuum mold surface with this more complex inversely curved shape.

In performing the vacuum forming, the vacuum mold surface 24 can have different configurations such as illustrated by FIGS. 5a, 5b and 5c. More specifically, as illustrated in FIG. 5a, the vacuum mold surface 24a has straight line elements over its entire extent such as is the case with cylindrical and conical shapes where a straight line can be drawn through every point on the surface. With such surfaces, the glass sheet forming can be performed with the peripheral mold 26 maintained in pressing engagement with the glass sheet periphery as illustrated. As illustrated in FIG. 5b, the vacuum mold surface 24b has cross-curvature in a direction transverse to the curvature illustrated in FIG. 4 and, with such more complex shapes, the upper peripheral mold 26 is preferably moved into a spaced relationship out of engagement with the glass sheet periphery so as to permit the glass sheet to move along the vacuum mold surface during the vacuum impulse forming. Likewise, as illustrated in FIG. 5c, the vacuum mold surface 24c has inversely curved portions 58 and 60 in a direction transverse to the curvature illustrated in FIG. 4. These inversely curved portions 58 and 60 have centers of curvature on the opposite sides of the mold surface and forming of this more complex Shape, like the cross-curvature indicated in FIG. 5b, is preferably performed with the upper peripheral mold 26 spaced from the glass sheet periphery. The vacuum mold surface 24a of the FIG. 13 embodiment of the forming apparatus likewise can have straight line elements over its entire extent, curved shapes in directions that are transverse to each other, and inversely curved portions.

Figure 6:
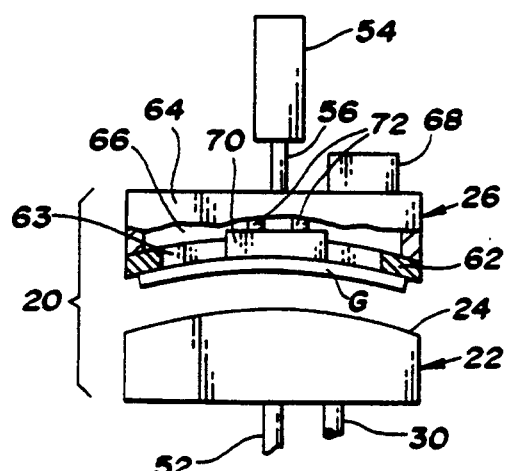
FIG. 6 is a view taken in the same direction as FIG. 4 and illustrates the formed glass sheet transferred from the lower vacuum mold to the upper peripheral mold in connection with subsequent delivery for cooling.

As best illustrated in FIG. 3, the peripheral mold 26 preferably is a ring 62 having an open center 63 such that the upper glass sheet surface is only engaged at its periphery during the forming. An enclosure 64 of the peripheral mold as best illustrated in FIG. 6 defines a vacuum chamber 66 in which a vacuum is drawn by a gas jet pump or fan 68 mounted on top of the enclosure or at another remote location. After the vacuum impulse forming of the glass sheet is completed, the vacuum mold 22 releases the formed glass sheet from its surface 24, preferably with an assist from the pressurized gas source 45 previously described in connection with FIG. 1, and the formed glass sheet is then received and supported by the vacuum drawn within the upper peripheral mold 26 which is then moved upwardly to the position of FIG. 6 in preparation for subsequent delivery of the formed glass sheet for cooling. A shape retention pad 70 is helpful with many glass shapes and is mounted by adjustable supports 72 within the open mold ring center 63 as shown in FIG. 2. This shape retention pad 70 prevents the vacuum drawn within the peripheral mold vacuum chamber 66 shown in FIG. 6 from forming the glass sheet excessively upwardly to a concave shape within the center of the peripheral mold 26. Thereafter, the formed glass is delivered from the peripheral mold 26 for cooling such as by delivery to an annealing ring for slow cooling that provides an annealed glass sheet or to a quench ring for quenching that provides a tempered glass sheet. It should be noted that the apparatus 20a is illustrated in FIG. 13 with its downwardly convex upper peripheral mold 26a lacking any shape retention pad like the shape retention pad 70 illustrated with the concave embodiment of FIG. 1; however, it should be appreciated that the shape retention pad could also be used with the FIG. 13 embodiment.

With reference to FIG. 7, another embodiment of the apparatus is identified by 120 and includes a vacuum mold 122 that occupies an upper position such that its full surface 124 faces downwardly. This downwardly facing vacuum mold surface 124 has a downwardly concave shape. The peripheral mold 126 of this embodiment occupies a lower position with its curved shape facing upwardly with a convex configuration that is complementary to the downwardly facing concave surface 124 of the upper vacuum mold 122. The vacuum system 28 communicates the upper vacuum mold 122 with the vacuum reservoir 32 by communication with its chamber 134 which is communicated by openings 136 with the vacuum mold surface 124. These openings 136 as shown in FIG. 8 are preferably located just inwardly from the location at which the lower peripheral mold 126 presses the glass sheet periphery against the mold surface 124 during the forming cycle.

As illustrated in FIG. 9, the glass sheet forming cycle begins with the glass sheet initially deposited on the lower peripheral mold 126 with an actuator 154 through its connection 156 to the upper vacuum mold 122 providing positioning of the molds in a spaced relationship to each other. The lower peripheral mold 126 may be moved horizontally by an actuator connection 152 to receive the heated glass sheet from a topside transfer device or the topside transfer device may be moved horizontally over the lower peripheral mold to deposit the glass sheet thereon for forming. Thereafter, the actuator 154 moves the vacuum mold 122 downwardly such that the peripheral mold 126 presses the periphery of the glass sheet against the downwardly facing surface 124 of the vacuum mold. The vacuum conduit 30 is flexible to permit the vertical movement of the vacuum mold 122.

Figure 11A:
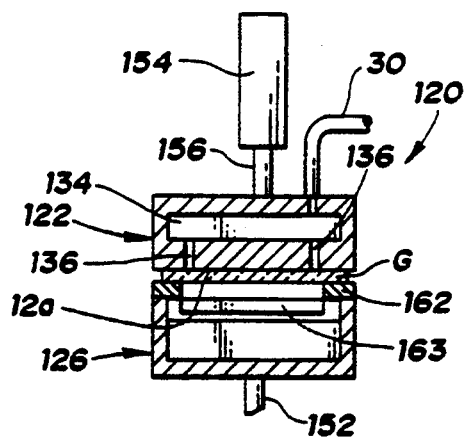
FIG. 11a is a sectional view of the apparatus taken along the direction of line 11a—11a in FIG. 10 and illustrates the manner in which straight-line element shapes are formed with the vacuum mold and peripheral mold maintained in a pressing relationship with the glass sheet periphery.
Figure 11B:
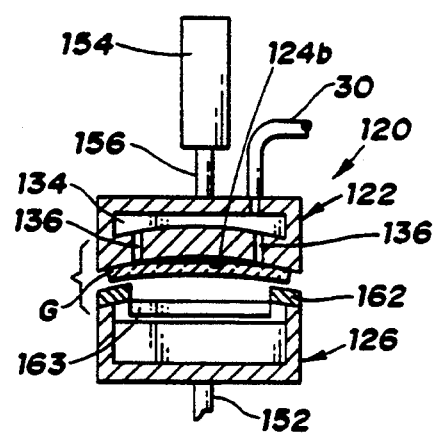
FIG. 11b is a sectional view taken in the same direction as FIG. 11a and illustrates the apparatus with its vacuum mold surface shaped so as to provide cross-curvature to the curvature shown in FIG. 10 and also illustrates the manner in which the peripheral mold is moved out of engagement with the glass sheet as the vacuum is provided to form such a more complex shape.
Figure 11C:
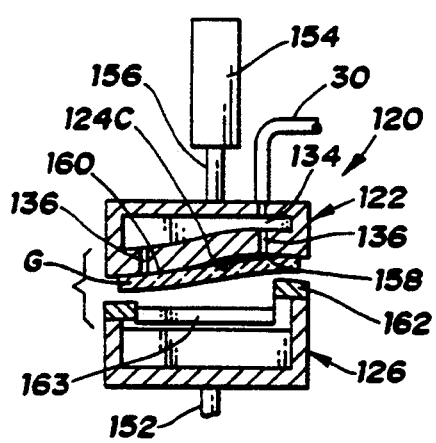
FIG. 11c is also a view taken in the same direction as FIG. 11a with the vacuum mold surface having inverse curves in a direction transverse to the curvature shown in FIG. 10 and likewise illustrates the peripheral mold in a spaced relationship from the glass sheet during the vacuum forming to this more complex shape.
Figure 12:
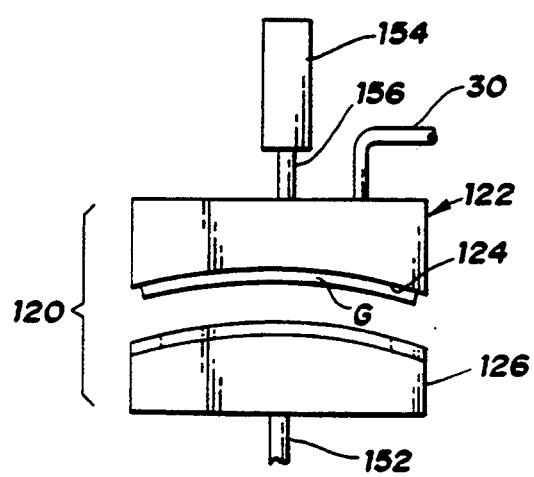
FIG. 12 illustrates the apparatus at a further stage with the molds moved into a farther spaced relationship in preparation for delivery of the formed glass sheet from the upper vacuum mold for cooling.

As illustrated in FIGS. 11a, 11b and 11c, the cycle proceeds to provide glass sheet forming to a configuration that depends upon the ultimate formed shape desired. More specifically, the glass sheet G as shown in FIG. 11a is pressed against a surface 124a with straight line elements such as is the case with cylindrical or conical bends and, in such cases, the peripheral mold 126 is maintained in pressing engagement with the glass sheet periphery. It is also possible to provide cross-curvature such as indicated by the vacuum mold surface 124b in FIG. 11b with such curvature being transverse to the curvature illustrated in FIG. 10 and, in such cases, the lower peripheral mold 126 is moved into a spaced relationship with the glass sheet periphery to permit such more complex shaped forming to proceed. Likewise as illustrated in FIG. 11c, the vacuum mold surface 124c may have inversely curved portions 158 and 160 in a direction transverse to the curvature illustrated in FIG. 10 and the lower peripheral mold 126 will then also be maintained in a spaced relationship to the glass sheet periphery during the vacuum forming.

The glass sheet is then formed on the downwardly facing vacuum mold surface 124 by the vacuum impulse of the vacuum system 28 with the two stage vacuum previously described in connection with the embodiment of FIGS. 1 through 6. The formed glass sheet is ultimately delivered by the upper vacuum mold 122 for cooling such as on an annealing ring to provide an annealed glass sheet or on a quench ring for quenching that provides a tempered glass sheet. The pressurized gas supplied from the gas source 44 of the vacuum system 28 provides a release of the glass sheet from the downwardly facing surface 124 upper vacuum mold 122 upon such delivery.

Figure 16:
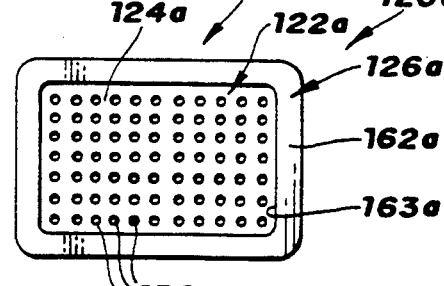
FIG. 16 is a plan view of the apparatus taken along the direction of line 16—16 in FIG. 15 to illustrate both the downwardly facing vacuum mold surface against which the vacuum forming is performed and the upwardly facing peripheral mold shade that initially seals the glass sheet periphery with the vacuum mold surface.
Figure 15:
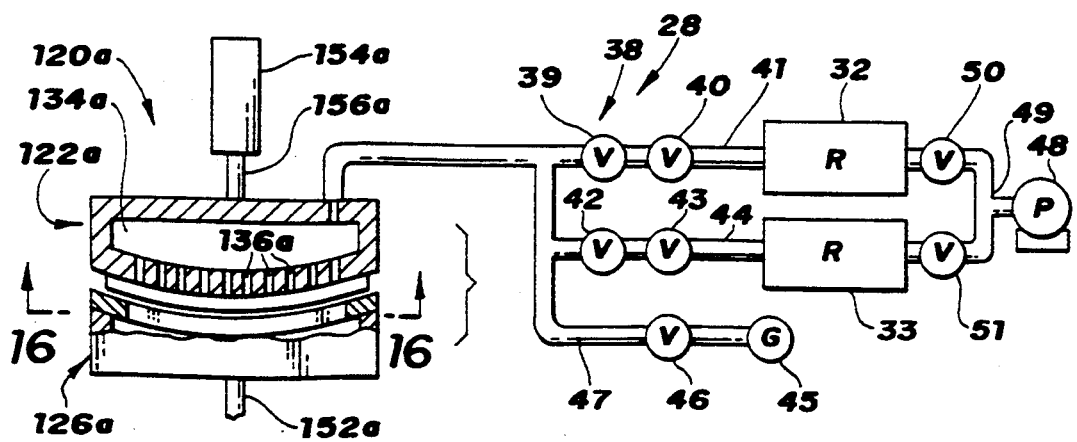
FIG. 15 is a view of another embodiment of the apparatus for vacuum forming a heated glass sheet wherein a lower vacuum mold has a downwardly facing vacuum mold surface of a downwardly facing convex shape against which a lower peripheral mold of an upwardly concave shape presses the periphery of the glass sheet.

With reference to FIGS. 15 and 16, another embodiment of the forming apparatus 120a is similar to the embodiment of FIGS. 7 and 8 such that like reference numerals with the subscript "a" are applied to like components thereof and most of the previous description is applicable. This embodiment of the forming apparatus 120a has its vacuum mold 122a located at the upper position and its peripheral mold 126a is located at the lower position. However, the downwardly facing surface 124a of the upper mold 122a has a convex shape and the lower peripheral mold 126a has an upwardly concave shape. Furthermore, the mold surface 124a has its vacuum openings 136a distributed over its entire extent. This vacuum mold surface 124a may have straight line elements, curvatures in transverse directions, or inversely curved portions like the different embodiments illustrated in FIGS. 11a, 11b, and 11c. Forming with the apparatus 120a proceeds as previously described in connection with FIGS. 7 through 12 excepted for the reversed relationship of the upper and lower mold shapes.

While the best modes for carrying out the invention have been described in detail, those familiar with the art to which this invention relates will recognize various alternative designs and embodiments for practicing the invention as defined by the following claims.

What is claimed is:

1. A method for forming a heated glass sheet comprising:
   sealing the periphery of the glass sheet against a full surface of a vacuum mold;
   initially communicating the vacuum mold surface within the sealed periphery of the glass sheet with a vacuum reservoir to provide a vacuum impulse of at least 0.1 atmospheres of vacuum to elastically form the glass sheet to the shape of the vacuum mold surface; and
   thereafter terminating the vacuum impulse at a predetermined time so as to reduce optical distortion of the hot glass sheet as a result of engagement with the mold surface.

2. A method as in claim 1 wherein the vacuum impulse is provided at the vacuum mold surface initially at a first level of vacuum and thereafter at a second greater level of vacuum.

3. A method as in claim 2 wherein the first and second levels of vacuum are provided by communicating the vacuum mold surface with a pair of vacuum reservoirs.

4. A method as in claim 1, 2 or 3 wherein the glass sheet periphery is sealed against the vacuum mold surface by a pressing operation of a peripheral mold which maintains the pressed relationship as the vacuum impulse is provided at the vacuum mold surface to form the glass sheet.

5. A method as in claim 1, 2 or 3 wherein the glass sheet periphery is initially sealed against the vacuum mold surface by a pressing operation of a peripheral mold which is thereafter positioned out of engagement with the glass sheet as the vacuum impulse is provided at the vacuum mold surface to form the glass sheet.

6. A method for forming a heated glass sheet comprising:
   sealing the periphery of the glass sheet by a peripheral mold against a full surface of a vacuum mold;
   initially communicating the vacuum mold surface within the sealed periphery of the glass sheet with a vacuum reservoir to provide a vacuum impulse of about 0.1 to 0.3 atmospheres of vacuum to initially form the glass sheet to the shape of the vacuum mold surface;
   thereafter communicating the vacuum mold surface with a vacuum reservoir to provide a second greater vacuum impulse of about 0.25 to 0.7 atmospheres of vacuum to elastically form the glass sheet to the shape of the vacuum mold surface; and
   finally terminating the second vacuum impulse at a predetermined time so as to reduce optical distortion of the hot glass sheet as a result of engagement with the mold surface.

7. A method for forming a heated glass sheet comprising:
   sealing the periphery of the glass sheet by a peripheral mold against a full surface of a vacuum mold;
   initially communicating the vacuum mold surface within the sealed periphery of the glass sheet with a first vacuum reservoir to provide a vacuum impulse of about 0.1 to 0.3 atmospheres of vacuum for about 0.5 to 2.0 seconds to initially form the glass sheet to the shape of the vacuum mold surface;
   thereafter communicating the vacuum mold surface within the sealed periphery of the glass sheet with a second vacuum reservoir to provide a second greater vacuum impulse of about 0.25 to 0.7 atmospheres of vacuum for about 0.5 to 6 seconds to elastically form the glass sheet to the shape of the vacuum mold surface; and
   finally terminating the second vacuum impulse at a predetermined time so as to reduce optical distortion of the hot glass sheet as a result of engagement with the mold surface.

* * * * *